March 26, 1963     W. G. HAWKINS     3,082,478

FLUID CONTROL VALVES

Filed Feb. 2, 1960     6 Sheets-Sheet 1

INVENTOR
WALLACE GERALD HAWKINS
BY
ATTORNEYS

March 26, 1963 W. G. HAWKINS 3,082,478
FLUID CONTROL VALVES

Filed Feb. 2, 1960 6 Sheets-Sheet 2

INVENTOR
WALLACE GERALD HAWKINS
BY
ATTORNEYS

Fig 4.

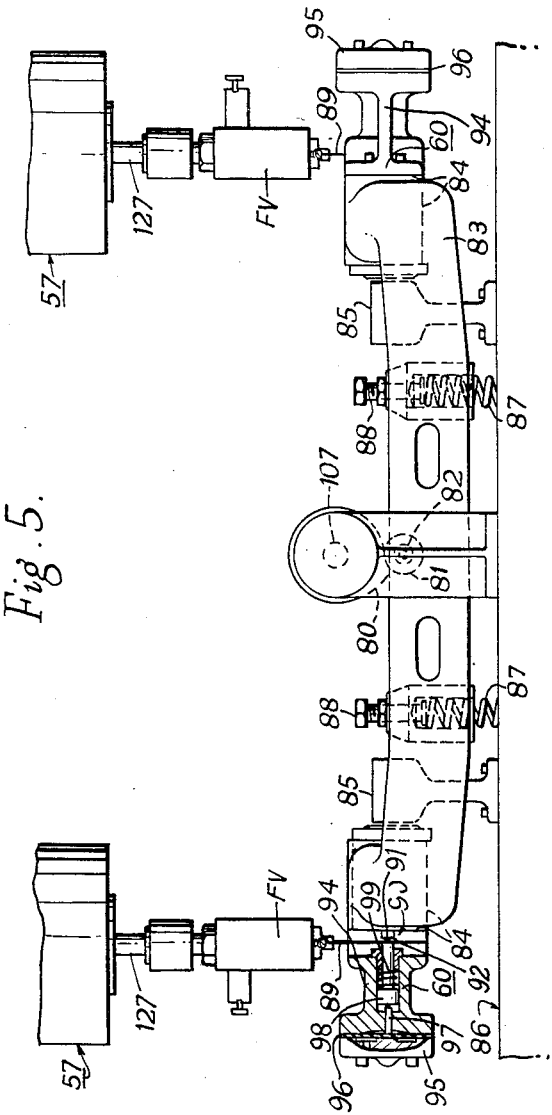

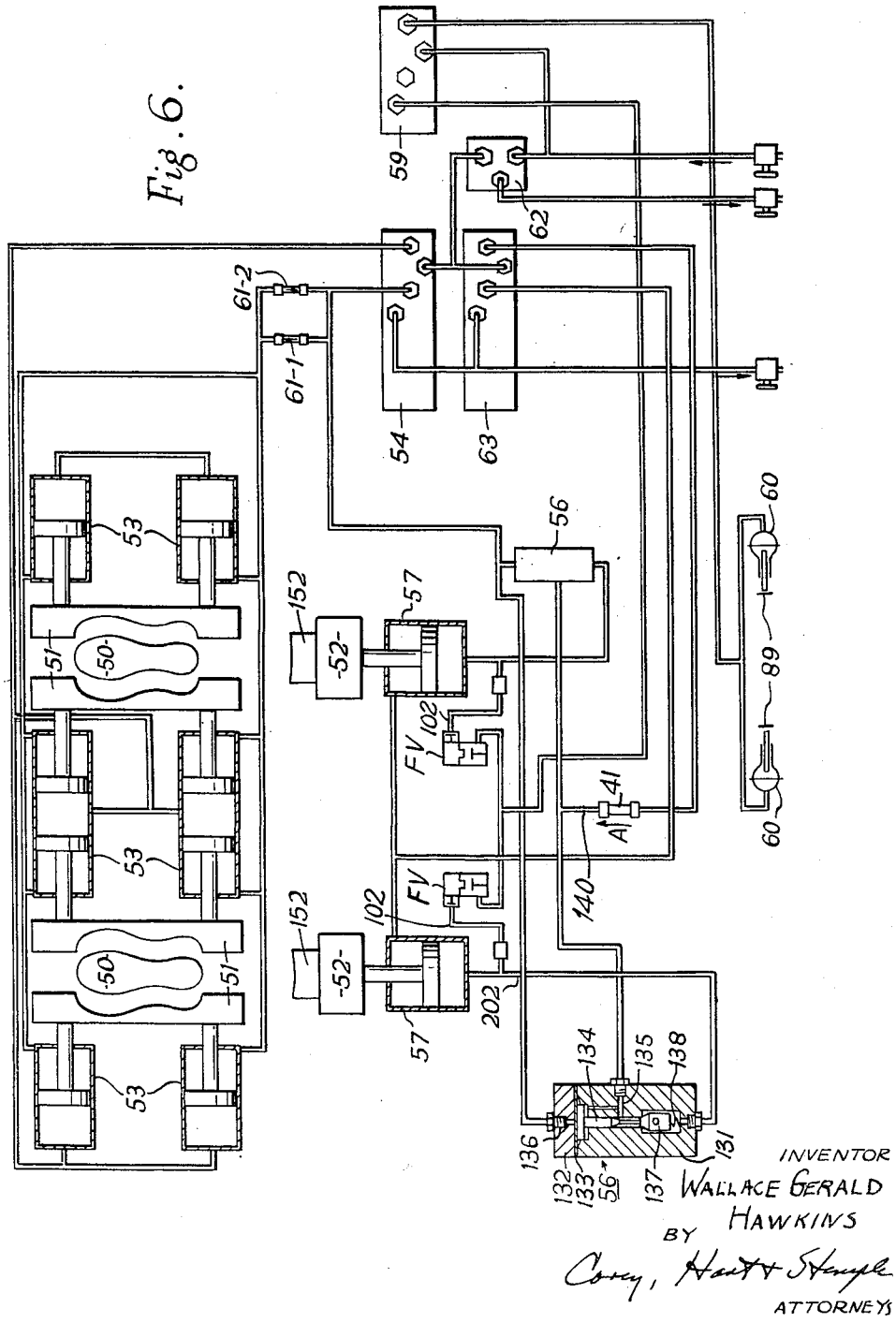

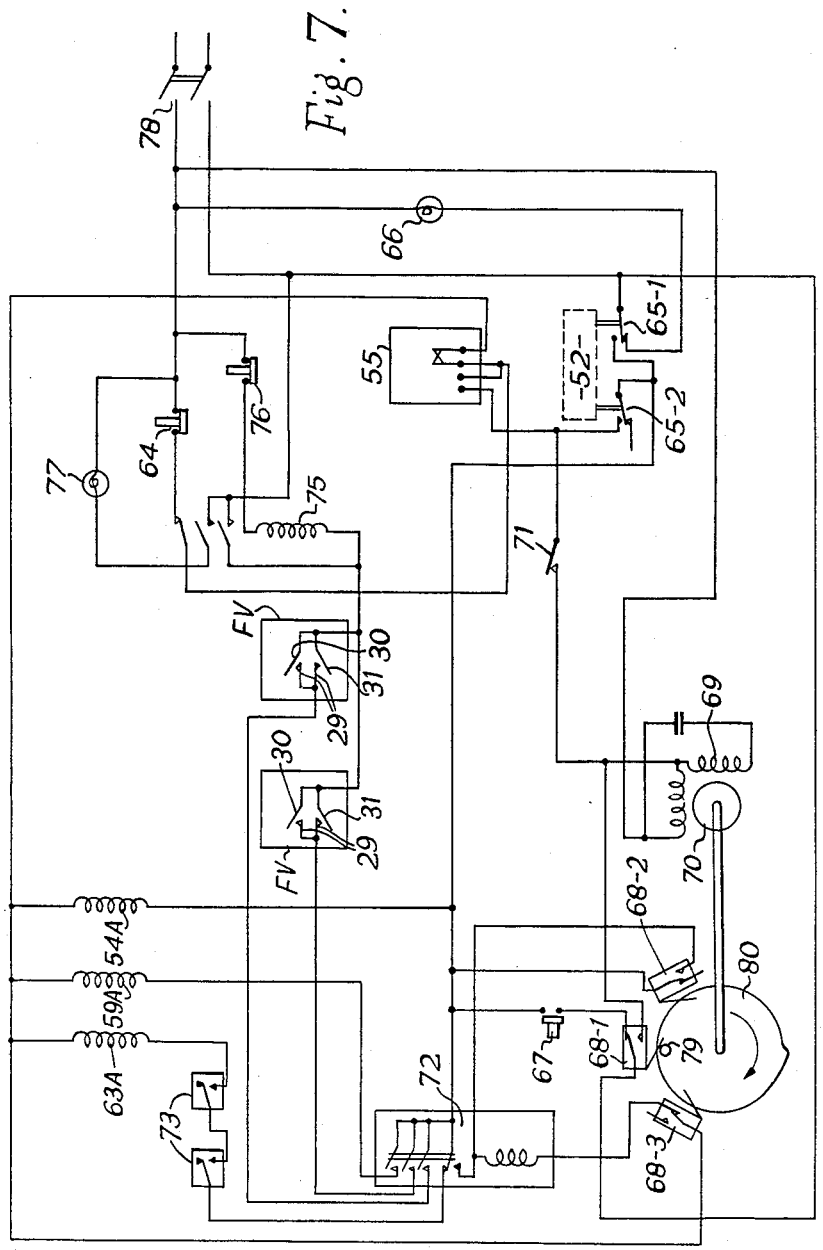

United States Patent Office 3,082,478
Patented Mar. 26, 1963

3,082,478
FLUID CONTROL VALVES
Wallace Gerald Hawkins, Ashcott, near Bridgwater, England, assignor to C.I.C. Engineering Limited, Somerset, England, a British company
Filed Feb. 2, 1960, Ser. No. 6,278
Claims priority, application Great Britain Feb. 4, 1959
8 Claims. (Cl. 18—17)

This invention relates to the moulding of articles in microcellular rubber and similar elastomeric substances, and has particular reference to fluid control means for shoe sole moulding and vulcanising machines as described in the specification of U.S. Letters Patent No. 3,044,122, issued July 17, 1962, in which patent the present applicant appears conjointly with Charles E. Webb.

In the machines described in said copending application a sole mould is withdrawn at a controlled rate to effect slight increase in the volumetric capacity of a moulding cavity in the moulding and simultaneous vulcanisation of a shoe sole composed of microcellular rubber; this withdrawal movement is of small magnitude and is required to be smoothly performed.

In one of the machines described in said copending application, a cam-rocked beam is adapted as and when required to have clamped thereto, a tape depending from a so-called rate control box, which is suspended on the tail of the piston rod of a sole mould unit, and said piston rod thus constitutes a component having a displacement which requires to be controlled at a predetermined constant or variable rate of movement. This component is hereinafter referred to as the displaceable component.

The main object of the present invention is to provide an improved control unit for controlling displacement of said displaceable component.

Another object of this invention is to provide such a control unit comprising a piston biased to a normal position wherein closure is effected of an orificed member associated with said displaceable component and moving responsive to operation of a fluid motor also forming part of the moulding machine. The said closure action serves to throttle the flow of fluid which consists (or has the same pressure as that) of pressure fluid being discharged from said fluid motor, the said biasing action being relieved by connecting said piston to a control element, as hereinafter defined, having the required displacement consequent upon fluid operation of the machine, in order to effect substantially smooth translational movement of the orificed member and of the machine component associated therewith.

In the moulding and vulcanising machine described with particular reference to FIGURES 5 to 18 of the abovementioned Patent No. 3,044,122, the control element above referred to takes the form of a tape, that is, the inextensible flexible tape (89) and the fluid control unit provided by this invention may be used in lieu of the rate control boxes (130) and associated valves (58) in the copending application.

Hereinafter, where reference is made to the control element it is to be understood as not necessarily in the form of a tape, but that it may comprise any suitable connection through which the required withdrawal movement may be transmitted to the piston of the control unit. In the following description of an embodiment of the present invention the reference characters which appear in parentheses, such as (89), (130) and (58) above, refer to components of the particular machine described in said copending application which bear those reference characters; the parentheses are omitted in the accompanying drawings.

By way of example, one form of control unit in accordance with this invention will now be more particularly described with reference to the accompanying drawings, wherein:

FIGURE 4 is a view similar to FIGURE 12 of the abovementioned copending aplication, showing how follower valve control units FV of the present invention are substituted for the rate control boxes (130), and FIGURE 5 is a view looking in the direction of arrow V in FIGURE 4, that is, it is a view similar to FIGURE 13 of the copending case.

Figure 8:
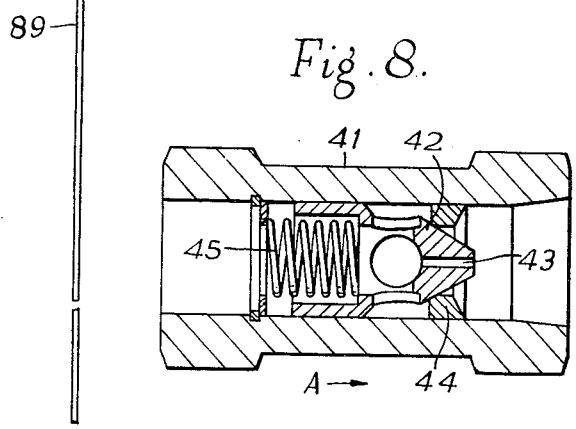

FIGURES 6 and 7 are fluid circuitry and electrical circuitry diagrams corresponding to FIGURES 5 and 6 respectively of the copending case, as modified by the use of the follower valve control units FV according to the present invention; FIGURE 6 also illustrates the incorporation of a restrictor valve, as hereinafter more particularly described, and FIGURE 8 is a sectional elevation of a suitable form of restrictor valve.

Figure 1:
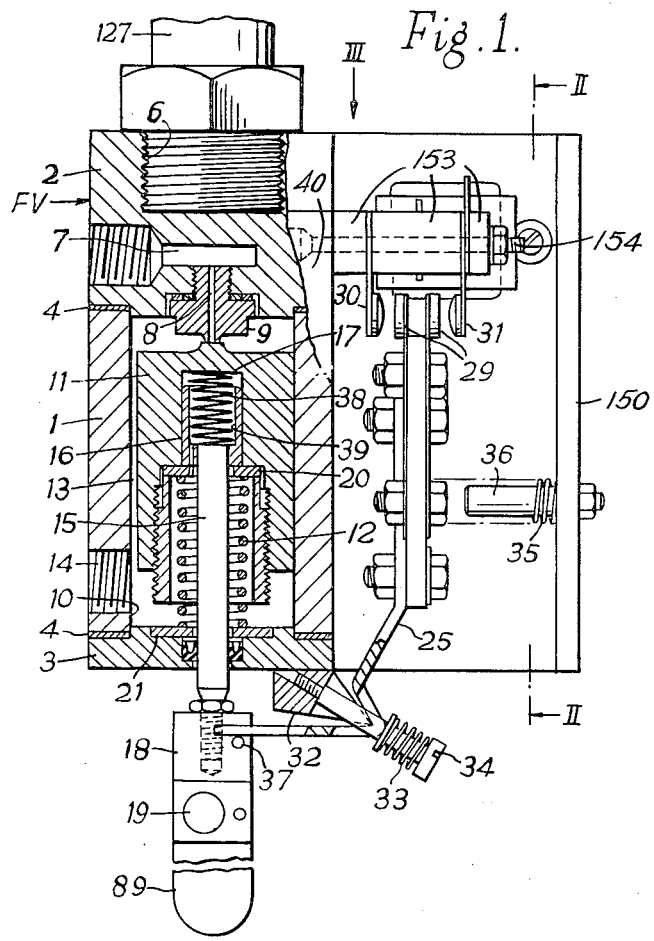
FIGURE 1 is a part-sectional vertical elevation of the control unit, which is in the nature of a follower valve FV.
Figure 3:
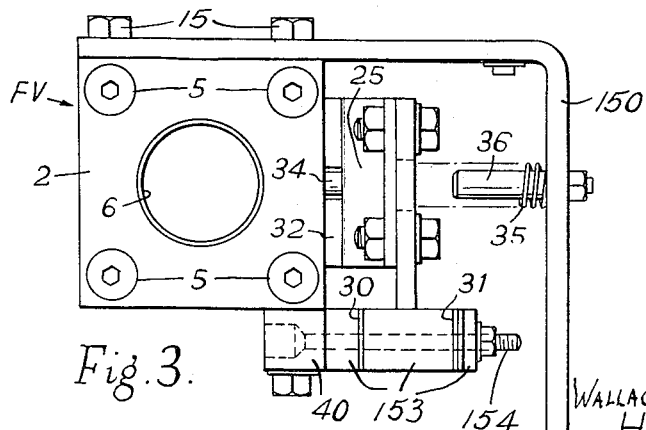
FIGURE 3 is a plan view looking in the direction of arrow III in FIGURE 1.
Figure 2:
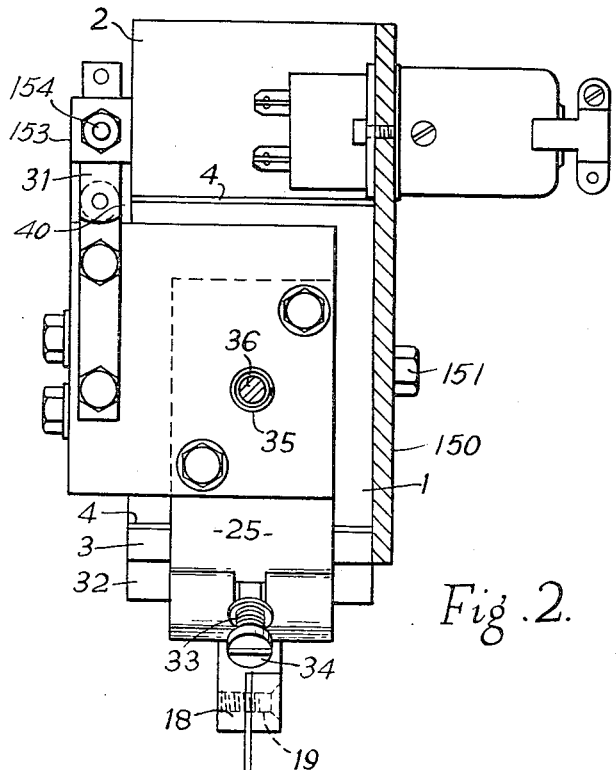
FIGURE 2 is a vertical section along line II—II of FIGURE 1.

The follower valve control unit FV illustrated in FIGURES 1, 2 and 3 comprises a centre valve body 1, a top cover 2 and a bottom plate 3 secured together with interposed gaskets 4 by tie bolts 5, the top cover 2 having a central tapped socket 6 for direct screwthreaded connection with the tail of the piston rod (127) of the sole mould cylinder unit (57) as shown more particularly in FIGURE 5.

The top cover 2 also has a transversely extending passage 7 adapted to be put into direct communication by a flexible pipe 102 with the discharge side of the piston of said cylinder unit (57) as shown in FIGURE 6, or with some other fluid source having fluid pressure variation in phase with the fluid discharging therefrom. Into the passage 7 opens one end of a small diameter orifice 8 provided in a plug 9 screwed into top cover 2 and extending into the bore 10 of the body 1, said orifice 8 being adapted for sealing by abutment with the crown of a piston 11 slidable in said bore 10.

The piston 11 is biased upwardly by a compression spring 12 and is relieved on its periphery, for example, by a "flat" 13, as shown, or by a groove to allow pressure fluid (usually oil) passing through the plug orifice 8 to escape via an exhaust port 14 in the valve body 1. A piston rod 15 is connected to piston 11 by slidably receiving the head 16 thereof within a socket 17 in said piston 11, said rod 15 extending through the bottom plate 3 for attachment to an adaptor 18 which may be detachably connected by clamping screw 19 to an inextensible tape subject to longitudinal displacement, that is, the tape (89) described in the abovementioned specification and shown in FIG. 2 herein.

The underside of piston head 16 abuts a washer 20 surmounting spring 12, so that when the tape (89) and piston rod 15 are displaced downwardly, the spring 12 is depressed and thus relieves the biasing load upon the piston 11. The lower end of spring 12 presses upon a seating washer 21 recessed into bottom plate 3. It is to be understood that piston 11 is mounted for floating movement and is biased solely by its abutment with washer 20, the piston head 16 being loose within the piston socket 17. A cranked lever 25 is rockable upon a fulcrum block 32, against which said lever 25 is yieldably held by a spring 33 encircling and abutting an anchor post 34.

The cranked lever 25 is biased in one direction by a spring 35 encircling a guide post 36, but is restrained by a stop pin 37 on the adaptor 18 of the tape (89); the guide post 36 being supported by a fence 150 secured by screws 151 to valve body 1. Lever 25 directly carries a pair of parallel-connected middle contact blades 29, one of which is adapted to engage a contact blade 30 and the other a contact blade 31; contact blades 30, 31 and spacers 153 therefor being carried by a screw 154 extending from a bracket 40 secured to the side of the valve body 1.

The piston rod 15 supporting the tape (89) and its adaptor 18 is made more sensitive by opposing the biasing action of spring 12 by a lighter spring 38 partially accommodated in a vented socket 39 formed in the upper face of the piston heads 16.

It will hereinafter become more apparent than in the operation of the follower valve FV above described, an electrical warning of override of its associated piston rod 127 and tape 89 in opposite directions relative thereto, is provided by means of the contact blades 30 and 31, which are normally open, as shown. When such condition occurs, either excessive movement of the piston 15 on the one hand, or of the valve body 1 on the other hand results, through the intermediary of the lever 25, in the closure of one or other of the juxtaposed paired override contact blades 30, 31.

The contacts of blades 30 and 31 correspond in effect to contacts (74–2) and (74–3) respectively of the rate control switch (74) described in the copending case as will be evident from FIGURE 7 hereof compared with FIGURE 6 in the application referred to. As already intimated the bleed valves (58) and the switch (74) housed in rate control box (130) are not required and there is, in any case, no equivalent for the contact (74–1) which is thus entirely eliminated—compare FIGURES 6 and 7 hereof with FIGURES 5 and 6 respectively of the copending case.

The override contacts 30 and 31—which, as already indicated, are used in lieu of the rate control switch contacts (74–2) (74–3)—serve, when closed, to operate the relay (72) of the vulcaniser and to de-energise the solenoids (54A) of the side mould solenoid valve (54) in the manner hereinafter described.

From the foregoing general description it will be understood that when the follower valve FV is secured to and reciprocates with the tail of the piston rod (127) of the sole mould cylinder unit (57) and the passage 7 of the follower valve FV has been put into communication with the lower end of the sole mould cylinder through pipe 102 in FIG. 6, the necessary amount of pressure fluid is bled off, when a microcellular moulding cycle is in operation, to effect the required small degree of sole mould retraction. Control of the discharging fluid is thus effected by piston 11 which is spring urged against the plug 9 to maintain the orifice 8 normally closed, said piston 11 being displaceable away from the orificed plug 9 by the movement of the flexible tape (89) operated by the cam-controlled beam (83) FIGURES 4 and 5.

FIGURE 6 illustrates as in the case of FIGURE 5 of the copending case, the fluid circuitry suitable for a twin-head machine for moulding and simultaneously vulcanising a rubber sole and heel unit to a shoe upper; in this figure and in FIGURE 7, the mechanical and electrical components employed are shown diagrammatically. Each head embodies components which together provide a sole moulding cavity, said components including the last (50) for supporting a shoe upper assembly, with attached insole or equivalent element (not shown in these figures), the pair of side moulds (51) and the sole mould (152) carried by ram (52); the components of the machine are not shown in their correct relative or operating positions.

The side moulds (51) for both machine heads are opened and closed by paired, horizontal fluid cylinder units (53) controlled by the common solenoid-operated valve (54), FIGURE 6, which latter is electro-magnetically controlled by the timer (55) FIGURE 7.

The side mould control valve (54) is also connected to two diaphragm valves (56) one for each machine head and arranged in parallel, and thence to the vertical fluid cylinder units (57) adapted to raise and lower the two sole mould rams (52).

The valves (56) are interposed in the pipe lines which connect with those ends of cylinder units (57) where admission of fluid effects elevation of the sole mould rams (52). The clamp control valve (59) receives pressure fluid direct from the pressure main of the machine and can supply fluid at reduced pressure through the reducing valve (62) to the side mould cylinder units (53)—via the control valve (54)—and to the sole mould cylinder units (57), via the solenoid-operated sole mould control valve (63) and the diaphragm valves (56). The main function, however, of the solenoid-operated clamp control valve (59) is to direct pressure fluid to the pair of fluid-operated tape clamps (60).

The side mould cylinder units (53) are connected to the control valve (54) through the oppositely-opening check valves (61–1) and (61–2) arranged in parallel. The solenoid operated valves (54), (59) and (63) are all of the known type in which the valve spools are returned to normal by spring pressure.

The timer (55) FIGURE 7, is adapted to be put out of action either by opening the normally closed push button "stop" switch (64) or when the microswitch (65–1) is operated by descent of one of the sole mould rams (52). The lamp (66) included in circuit with both of these switches (64), (65–1) indicates when the machine is in an operating condition. The manual motor start switch (67) is in series with the timer (55) and said cut-out switch (65–1) and one of the operation-stage microswitches, namely switch (68–1); in the descent of the sole mould ram (52) also operates the microswitch (65–2) the purpose of which is described later.

As in the case of the similar machine described in the copending case, it is convenient to divide the vulcanisation portion of the machine cycle into three stages. The first stage is effected at high pressure and is initiated by operation of microswitch (68–1), which is also connected to the field circuit (69) of the electric motor (70) and to the timer (55) via the manual change-over switch (71).

The first operation stage extends between the operation of microswitch (68–1), which is governed by operation of the sole ram switches (65–1), (65–2), and the operation of the second operation stage microswitch (68–2).

The second operation stage microswitch (68–2) connected to the self-holding relay (72) which includes contacts in circuit with the two-series-connected side mould microswitches (73) and through these with the solenoids (63A), (59A) and (54A) of the sole mould, clamp and side mould control valves (63) (59) and (54) respectively.

The relay (72) is also connected with contact blades 29 of the two follower valves FV. The over-ride contact blades 30, 31 of the follower valves FV are in series with the self-holding relay 75, which latter is provided with reset push button (76); the fault lamp (77), shunted across the stop button (64) from one of the contacts of relay (75), and the main switch (78) complete the electrical control system. Thus, when there is an excessive displacement of the cooperating piston rods 127 and tapes 89 in either direction such as to cause either of the contacts 30 or 31 to be engaged, the resultant current flow causes energization of the relay 75 to stop the machine and to illuminate the warning lamp 77. As previously indicated, normal current supply is through the main switch 78, normally closed switch 64 and the uppermost contact of the relay 75 and from thereon through the timer 55.

The three operation stage microswitches (68–1), (68–2)

and (68-3) are operated in succession by a pin (79) carried by a disc (80) which is driven by motor (70); in FIGURE 7 a direct mechanical connection is indicated diagrammatically between motor (70) and disc (80) but it will be evident that, as illustrated in the copending case, a speed reduction drive is necessarily employed.

Figure 4:
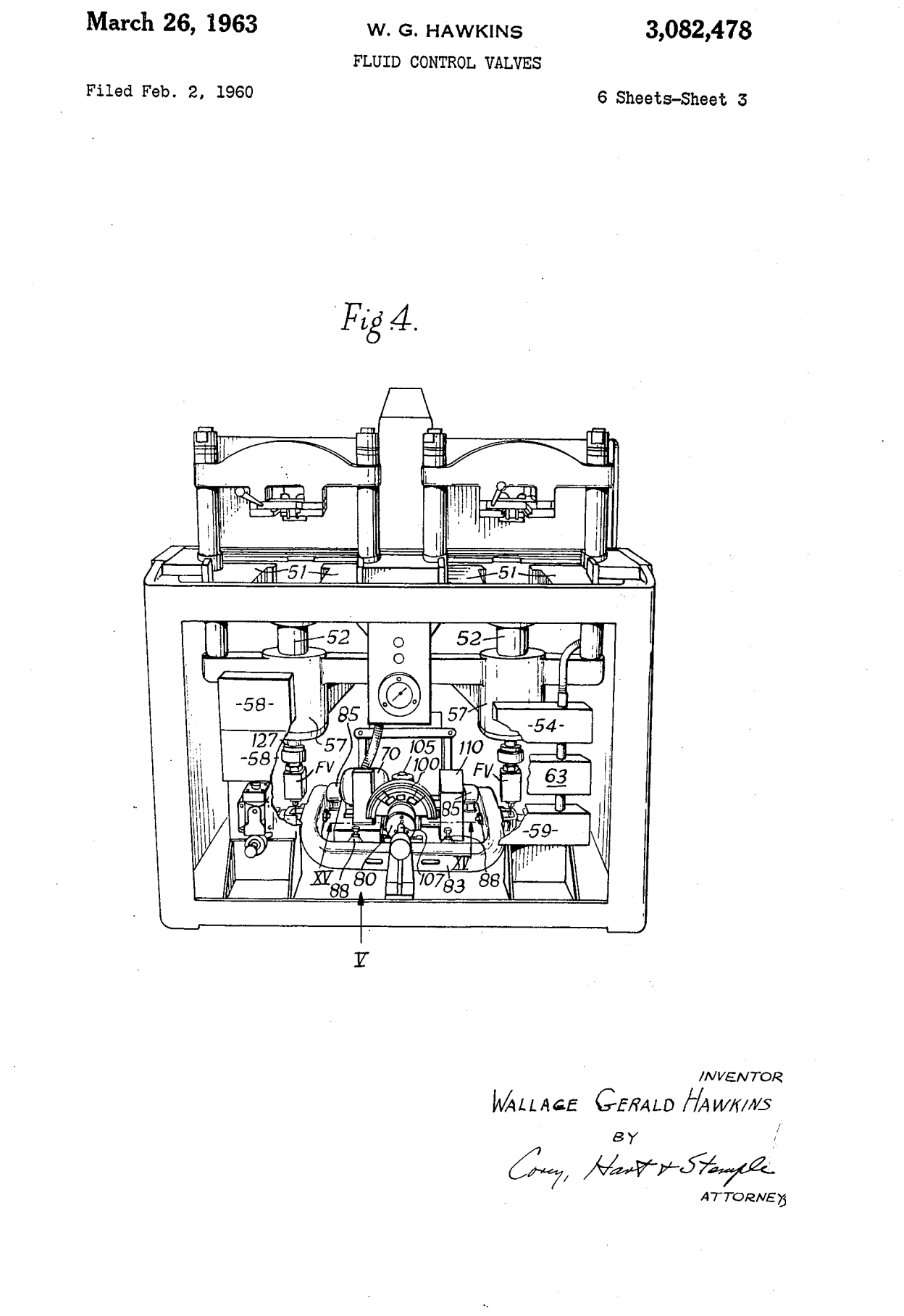

The disc 80 is in the form of a disc cam, as shown in FIGURES 4, 5 and 7, which during each revolution operates through the follower roller (81) to depress the rockable beam (83), said roller (81) being freely revolubly mounted on pin (82) carried by said beam (83). The beam (83) is of U-shape in plan and is supported at the rearwardly directed extremities of its side limbs on trunnions (84) carried by brackets (85) upstanding from a base plate (86). The out-of-balance beam (83) is supported on compression springs (87) acting on the bridge member of the beam through screws (88) which can be adjusted so that the beam may be counter-balanced by said springs and thus held in a poised condition such that it is readily rocked by the light pressure applied during its depression by cam (80).

On the side limbs of beam (83) are mounted the two fluid-operated clamps (60) previously referred to, which are adapted to clamp the lower ends of the two metal tapes (89) onto anvils (90) carried by the beam (83), each anvil comprising a ball (91) held captive but freely revoluble in a socket in the end of a spindle (92) screwed into a threaded hole in the beam (83).

Each fluid-operated clamp (60) comprises a cylinder (94) and a recessed cover (95) between which is interposed and peripherally secured a rubber or other flexible diaphragm (96) which transmits a displacement through the pin (97) to the plunger (98) biased by spring (99) to the inoperative position, that is, the "tape-free" position.

The operation stage microswitches (68-1), 68-2) and (68-3) are supported on the carrier block (100), the middle switch (68-1) being fixed relatively thereto and the outer switches (68-2), (68-3) being suspended for arcuate adjustment relatively to said block (100). The carrier block (100) and microswitches (68-1), (68-2), (68-3) are conveniently mounted adjacent the reduction gear box (105) in FIG. 4 which drives cam (80) through change-speed wheels—housed in casing (110)—from motor (70); further details as to a suitable drive being given in the said copending case.

Each of the diaphragm valves (56)—see FIGURE 6, where one valve is shown in section and somewhat enlarged—comprises the housing (131) and cover (132) between which is clamped the flexible diaphragm (133) made of rubber or any other suitable material. A flathead plunger (134) rests against said diaphragm (133) to transmit thereto pressure of fluid entering the valve housing by passage (135), in opposition to pressure of fluid entering by passage (136). The tail end of the plunger (134) operates a non-return check valve (137) which is biased to the closed position by spring (138). Each diaphragm valve (56) functions as a by-pass valve to permit of rapid opening at the end of the vulcanising period, when the diaphragm (133) is subjected to pressure in excess of the side mould opening pressure; displacement of said diaphragm operating through plunger (134) to shift the non-return check valve (137) to allow of more rapid exhausting of fluid from the sole mould cylinder unit (57).

Assuming the main switch (78) to have been closed, FIGURE 7, resulting in the lighting of "machine-on" lamp (66) the machine cycle is commenced by depression of the "start" button (67) which results in energisation of solenoid (54A) of the side mould control valve (54) with consequent movement of side moulds (51) under influence of the cylinder units (53) with the result that the side mould microswitches (73) are operated. This last action results in energisation of solenoid (63A) of the sole ram control valve (63) whereupon the sole mould rams (52), FIGURE 6, are elevated under influence of the cylinder units (57), the rising sole rams (52) operating switches (65-1), (65-2) which bring the timer (55) into circuit, whereupon the starting coils (69) of motor (70) are energised and motor (70) begins to turn disc cam (80).

In FIGURE 7 the cam (80) is shown in its normal "at rest" position, that is, in readiness to be turned by motor (70) at the commencement of a machine cycle. The first operation stage already referred to is thus initiated, that is, vulcanising at conventional high pressure and this stage which commences with operation of the sole rams (52) terminates when trip pin (79) on cam (80) trips microswitch (68-2), which, as already indicated is adjustable angularly in relation to microswitch (68-1). The duration of the whole three-stage period is varied by altering the rate of turning of cam (80) in relation to the speed of motor (70) usually by changing the change wheel in casing (110).

When microswitch (68-2) is operated the coil of self-holding relay (72) is energised and the closing of this relay results also in energisation of solenoid (59A) of the clamp control valve (59), accompanied by de-energising of solenoid (63A) of the sole mould control valve (63).

The resulting movement of the spool of valve (63) effects reversal in the direction of flow of the pressure fluid to bring about lowering of the sole rams. Almost simultaneously the tapes (89), clamped by diaphragm clamp units (60) commence to descend under a pull imposed by the counter-balanced beam (83) which is being rocked downwards on its trunnions (84) by the cam (80) through follower roller (81); in consequence, follower valve control units FV descend with the sole ram piston rods (127).

The cam (80) is, of course, "set" so that the changing contour of the cam edge acts upon beam (83) through follower roller (81) in the second operation stage—namely, between microswitches (68-2) and (68-3)—to provide the required kind of control of that period of the vulcanising cycle, in order to secure unidirectional expansion by enlarging slightly the volumetric capacity of the moulding chamber; that is, the cam contour may provide for a constant or a variable rate of retraction of sole rams (52). The contacts 29 of the follower valves FV, which have been closed by the descending clamped tapes (89) are opened by the return movements of sole rams (52).

When eventually trip pin (79) operates microswitch (68-3) the self-holding relay (72) is released and the final stage of vulcanisation is effected under full pressure for a period depending on the angular spacing between microswitches (68-3) and (68-1). Actuation of microswitch (68-1) completes the cycle, as in the machine in the copending case, the motor (70) being cut-out of circuit, and, if the cycle period set by the timer (55) has expired, opening of the moulds is effected. The change-over switch (71), as before, is adapted to isolate the components concerned with unidirectional expansion of microcellular rubber and the like by increase of mould capacity, so that the machine can be used for conventional high pressure moulding.

The operating cycle of the machine provided with the improved follower valve control units is therefore substantially the same as in the case of the machine having the rate control boxes and associated bleed valves according to the prior application. The main difference is that in the machine herein described, descent of the beam (83) displaces, through tape (89) the piston rod 15 of the appropriate follower valve FV, to which it is connected, the resultant depression of the spring 12 relieving or unloading the piston 11 to allow pressure fluid to issue through the orifice 8 in plug 9. The groove 13 in the piston 11 permits of escape of this fluid through the outlet 14 in the valve back to the "drain" return lines of the machine.

Descent of the sole mould ram, and thus the body 1 of the follower valve tends to re-establish abutment of the piston 11 with the orificed plug 9, thereby effecting a throttling action upon the flow of the exhausting pressure fluid. The form of the spring 12 is sufficient to lift piston 11 to close the orifice 8 should the rate of descent of the valve body 1 (with the sole mould piston) exceed that of the cam-controlled tape (89) and the piston rod 15 connected thereto. In operation, however, the throttling action effected by the interrelation of the piston 11 and the orifice 8 suffices to provide a substantially stepless descent of the sole mould piston in accordance with movement of the beam controlled tape (89).

The inextensible tape (89) is substantially flexible in a lateral direction but sufficiently rigid in a longitudinal direction to maintain the sole mould piston in a constant position relative to the beam (83) in the event of the valve body 1 (which is fixed to said sole mould piston rod) being displaced downwards in excess of the required position.

It will be appreciated that fluid flow through the follower valve FV described is unidirectional and is thus in correspondence with the controlled unilateral movement required in the vulcaniser referred to, where the reverse motion or action—that is, upward rocking of the beam (83) to which the tape (89) is clamped—is performed by bias springs (87). Where control of movement in both directions is required the follower valve according to this invention may be associated with a suitable change-over device rendering the controlled unilateral movement of the follower valve available in opposite directions of travel.

Limitations of space for accommodating the machine head may make it difficult to employ the proper number of switches (73) for effective operation of the side moulds (51). The use of only two side mould switches (73), however, may, because of erratic closing of said side moulds, result in premature operation of the sole piston solenoid valve (63). There may also exist a tendency for the side moulds (51) to open due to the drop in pressure experienced as the sole mould (152) applies pressure to the rubber mass during moulding.

With a view to meeting these problems use may be made, as shown in FIGURE 6 of a restrictor valve 41 interposed in the common feed line 140 to the diaphragm valves (56) leading to the sole mould cylinder units (57) to reduce the pressure drop and thus maintain high pressure by the closing operation of the side moulds (51). This restrictor valve 41 has the effect of increasing time for closing the sole mould (152) to a suitable extent, for example, by approximately two seconds. The side moulds (51) therefore have this additional period, of say two seconds, in which to close and in this they are assisted by the maintenance of full pressure. The restrictor valve 41 (FIGURE 8) is a conventional non-return valve in which a plunger 42 is provided with a comparatively fine orifice 43 which permits of a restricted flow in the direction indicated by arrow A in FIGURES 6 and 8. The plunger 42 is biased to closing on a ring seating 44 by a spring 45 in known manner.

Whilst the foregoing disclosure has in general assumed that the displaceable component, which effects slight increase in the volumetric capacity of the moulding cavity formed by relatively movable components of a rubber sole moulding and vulcanising machine, is associated with the sole mould of such a machine, it will be understood by those acquainted with the moulding of microcellular elastomeric masses that the same follower valve control unit may be used where the displaceable component is any one of relatively movable parts which provide for such mould capacity increase.

I claim:
1. A moulding machine comprising, in combination, a frame, relatively movable mould-forming components mounted on said frame and forming a variable capacity moulding cavity, a fluid cylinder unit on said frame having a ram movable with one of said mould forming components and constituting a displaceable component for withdrawal at a controlled rate to effect slight increase in the volumetric capacity of the moulding cavity, and a control unit for controlling displacement of said displaceable component, said control unit comprising a valve body connected to said ram so as to be movable therewith and having an orifice therein, a piston slidable in said valve body for controlling the flow of a fluid through said orifice and constructed to by-pass pressure fluid flowing through said orifice, means biasing said piston to a normal position wherein it effects closure of said orifice, conduit means connecting said fluid cylinder unit to said orifice to permit discharge of fluid from said cylinder unit through said orifice, said closure action of said piston serving to throttle the flow of pressure fluid being discharged from said cylinder unit via said orifice, and control means connected to said piston and operable to actuate the same to permit flow of pressure fluid through said orifice and thereby cause withdrawing movement of said displaceable component, said control means comprising means connected to said piston and operable to move the latter relative to said orificed valve body and said displaceable component and away from said orifice in opposition to the biasing action of said biasing means, and means for moving said connecting means to effect such opening of the orifice so that said displaceable component is caused to be withdrawn at a predetermined rate, said control means having the required displacement consequent upon fluid operation of the machine to effect substantially smooth translational movement of the orificed valve body and of said displaceable component associated therewith.

2. A machine as claimed in claim 1, in which said control connecting means comprises a plunger slidably supported by said piston and spring bias means for yieldably limiting endwise movement of said plunger in one direction.

3. A machine as claimed in claim 2, in which said yielding means comprises spring means biasing said plunger in the direction of uncovering of the orifice by the piston, said spring means being of less strength than said piston biasing means.

4. A machine as claimed in claim 1, wherein said control connecting means comprises a tape extending in and longitudinally inextensible in the direction of displacement of said displaceable component to increase mould cavity capacity, and wherein said control moving means comprises a cam controlled rocking beam, said connecting means further including means connecting one end of said tape to said rocking beam and the other end thereof to said piston.

5. A machine as claimed in claim 1, in which said control means includes a lever rockable on said valve body and connected to said piston, solenoid means operable to rock said lever and thereby move said piston against the pressure of said biasing means to initiate mould-capacity-increase movement of said displaceable component, and electrical circuitry connected to said solenoid means and including an operation cycle control timer and relay means for stopping the machine.

6. A machine as claimed in claim 5, wherein said electrical circuitry includes electrical contacts directly mounted on said lever and cooperating with other contacts carried in fixed relation to said valve body to illuminate a warning light.

7. A moulding machine comprising a plurality of mould components forming a mould cavity, a fluid cylinder unit having a ram for moving one of said mould forming components to vary the capacity of the moulding cavity, means for supplying fluid under pressure to said fluid cylinder unit, a first means operative to cause said supply means to apply fluid pressure to one side of said ram to move said one mould component from a retracted open mould position to an advanced mould position, a second means operative at the end of a given period to cause said supply means to apply fluid pressure to the other side of said ram to move said one mould component from an advanced mould position to said retracted open mould position, and a control unit for causing displacement of said ram from an advanced mould position toward retracted open mould position to increase the capacity of the mould cavity by a given amount before said second operative means operates to withdraw said one mould component to open mould position, said control unit comprising a valve body connected to said ram so as to be movable therewith and having an orifice therein, conduit means connecting said fluid cylinder unit to said orifice to permit the discharge of fluid on said one side of said ram from said cylinder unit through said orifice, a piston slidable in said valve body for controlling the flow of fluid from said fluid cylinder unit through said orifice, means biasing said piston to a normal position where it effects closure of said orifice to render said control unit inoperative to displace said ram during the movement of the latter by said first operative means in moving said one mould component to an advanced mould position, and means connected to said piston and operable to positively move the latter relative to said ram and away from said orifice at a predetermined rate after the operation of said first operative means and before the operation of said second operative means at the end of said given period and against the action of said biasing means to permit the flow of fluid through said orifice and thereby permit sufficient withdrawal of fluid from said cylinder unit on said one side of said ram as to cause displacement of said ram in a retracted direction to increase the moulding cavity, said second operative means coming into operation at the end of said given period to further displace the ram in a retracted direction to open said mould.

8. A moulding machine comprising a plurality of mould components forming a mould cavity, a fluid cylinder unit having a ram for moving one of said mould forming components to vary the capacity of the moulding cavity, means for supplying fluid under pressure to said fluid cylinder unit, a first means operative to cause said supply means to apply fluid pressure to one side of said ram to move said one mould component from a retracted open mould position to an advanced mould position, a second means operative at the end of a given period to cause said supply means to apply fluid pressure to the other side of said ram to move said one mould component from an advanced mould position to said retracted open mould position, and a control unit for causing displacement of said ram from an advanced mould position toward retracted open mould position to increase the capacity of the mould cavity by a given amount before said second operative means operates to withdraw said one mould component to open mould position, said control unit comprising a valve body carried by said ram and movable therewith and having an orifice therein, conduit means connecting said fluid cylinder unit to said orifice to permit the discharge of fluid on said one side of said ram from said cylinder unit through said orifice, a piston slidable in said valve body for controlling the flow of fluid from said fluid cylinder unit through said orifice, means biasing said piston to a normal position where it effects closure of said orifice to render said control unit inoperative to displace said ram during the movement of the latter by said first operative means in moving said one mould component to an advanced mould position, and means connected to said piston and operable to positively move the latter away from said orifice after the operation of said first operative means and before the operation of said second operative means at the end of said given period and against the action of said biasing means to permit the flow of fluid through said orifice and thereby permit sufficient withdrawal of fluid from said cylinder unit on said one side of said ram as to cause displacement of said ram in a retracted direction to increase the moulding cavity, said operable means tending to restrict the extent of movement of said piston away from said orifice, whereby as said ram is retracted during the discharge of fluid through said orifice, said valve body is moved therewith to move said orifice towards said piston to tend to reestablish closure of said orifice and thereby effect a throttling action on the flow of the discharging fluid, said second operative means coming into operation at the end of said given period to further displace the ram in a retracted direction to open said mould.

References Cited in the file of this patent
UNITED STATES PATENTS

| | | |
|---|---|---|
| 1,957,697 | Conway | May 8, 1934 |
| 2,285,069 | Vickers | June 2, 1942 |
| 2,358,353 | Stacey | Sept. 19, 1944 |
| 2,763,897 | Gates et al. | Sept. 25, 1956 |